(12) United States Patent
Elms

(10) Patent No.: US 7,359,167 B2
(45) Date of Patent: Apr. 15, 2008

(54) CORDED LEAKAGE-CURRENT DETECTION AND INTERRUPTION APPARATUS

(75) Inventor: Robert T. Elms, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 200 days.

(21) Appl. No.: 11/058,586

(22) Filed: Feb. 15, 2005

(65) Prior Publication Data

US 2006/0181820 A1 Aug. 17, 2006

(51) Int. Cl.
  *H02H 3/00* (2006.01)
(52) U.S. Cl. ........................................ 361/42
(58) Field of Classification Search .................. 361/42, 361/44
  See application file for complete search history.

(56) References Cited

U.S. PATENT DOCUMENTS

| | | | |
|---|---|---|---|
| 3,736,468 A | | 5/1973 | Reeves et al. |
| 4,081,852 A | | 3/1978 | Coley et al. |
| 4,685,022 A | * | 8/1987 | Nichols et al. ............... 361/44 |
| 4,791,519 A | * | 12/1988 | Madsen ........................ 361/42 |
| 5,148,344 A | | 9/1992 | Rao et al. |
| 5,260,676 A | | 11/1993 | Patel et al. |
| 5,293,522 A | | 3/1994 | Fello et al. |
| 5,642,248 A | * | 6/1997 | Campolo et al. ............. 361/42 |
| 5,892,593 A | | 4/1999 | Kim |
| 5,896,262 A | | 4/1999 | Rae et al. |
| 6,525,914 B1 | * | 2/2003 | Legatti ......................... 361/42 |
| 6,573,665 B2 | * | 6/2003 | Cooper et al. ............... 315/291 |
| 6,608,741 B1 | * | 8/2003 | Macbeth ....................... 361/42 |
| 2003/0066670 A1 | | 4/2003 | Parise et al. |
| 2004/0070895 A1 | | 4/2004 | Gershen et al. |
| 2004/0070899 A1 | | 4/2004 | Gershen et al. |

OTHER PUBLICATIONS

Underwriters Laboratories Inc., "AFCI Types and Product Categories", http://www.ul.com/regulators/afci/categories.html, Feb. 23, 2002, 1 p.

* cited by examiner

*Primary Examiner*—Michael Sherry
*Assistant Examiner*—Lucy Thomas
(74) *Attorney, Agent, or Firm*—Martin J. Moran

(57) ABSTRACT

A leakage-current detection and interruption apparatus includes a plug adapted to receive an alternating current voltage, pairs of separable contacts adapted to receive the AC voltage from the plug, and an operating mechanism adapted to open and close the contacts. A power cord includes line and neutral power conductors adapted to conduct the AC voltage from the contacts to the load, a ground conductor, and two non-load carrying, non-ground conductors. One or both of the conductors do not shield one or both of the power conductors. A detection circuit is adapted to detect cord faults. The detection circuit includes a ground fault detection circuit having a current transformer with an opening through which the power conductors pass. The ground fault detection circuit cooperates with the non-load carrying, non-ground conductors to detect one or more of the cord faults and with the operating mechanism to interrupt the detected faults.

10 Claims, 3 Drawing Sheets

CORDED LEAKAGE-CURRENT DETECTION AND INTERRUPTION APPARATUS

BACKGROUND OF THE INVENTION

1. Field of the Invention

The invention pertains generally to circuit interrupters and, more particularly, to corded leakage-current detection and interruption apparatus.

2. Background Information

Ground fault circuit interrupters (GFCIs) include, for example, ground fault circuit breakers, ground fault receptacles and cord mounted ground fault protection devices. GFCIs and arc fault current interrupters (AFCIs) are well known in the art. Examples of ground fault and arc fault circuit breakers are disclosed in U.S. Pat. Nos. 4,081,852; 5,260,676; 5,293,522; 5,896,262; and 5,892,593.

In ground fault circuit breakers, for example, an electronic circuit typically detects leakage of current to ground and generates a ground fault trip signal. This trip signal energizes a trip solenoid, which unlatches an operating mechanism, often through deflection of the armature of a thermal-magnetic trip device. Ground fault circuit breakers include both Class A (e.g., ground fault current of about 5 mA for people protection) and equipment protective devices (e.g., ground fault current of about 30 mA; of about 20 to about 100 mA).

A typical GFCI includes an operational amplifier which amplifies the sensed ground fault signal and applies the amplified signal to a window comparator which compares it to positive and negative reference values. If either reference value is exceeded, then a trip signal is generated. A common type of ground fault detection circuit is the dormant oscillator detector. This detector includes a first sensor coil through which the line and neutral conductors of the protected circuit pass. The output of the first sensor coil is applied through a coupling capacitor to the above-described operational amplifier followed by the window comparator. A line-to-ground fault causes the magnitude of the amplified signal to exceed the magnitude of the reference values and, thus, generates a trip signal.

The dormant oscillator detector typically includes a second sensor coil. At least the neutral conductor of the protected circuit passes through the second sensor coil. A neutral-to-ground fault couples the two detector coils which causes the amplifier to oscillate, thereby resulting in the generation of the trip signal.

A leakage-current detection and interruption (LCDI) device is provided in a power supply cord or cord set that senses leakage current flowing between or from the integral cord conductors and interrupts the circuit at a predetermined level of leakage current. For example, cord protection has recently been required for air conditioners per UL 1699.

U.S. Pat. No. 5,148,344 discloses an appliance leakage current interrupter (ALCI) comprising a ground fault detecting circuit and a trip mechanism that is automatically actuated in response to the presence of a ground fault.

U.S. Pat. No. 5,642,248 discloses a phase wire, a neutral wire and a ground wire, which are utilized within an electrical extension or power cord with built-in safety protection. The power cord also includes a conductive braid (i.e., fine mesh shield) which is electrically connected to the ground wire at a receptacle end. The phase wire is electrically connected to the anode of a diode within a plug housing including a GFCI. The cathode of the diode is electrically connected through a resistor to the anode of a light emitting diode (LED), also contained within the housing. The cathode of the LED is electrically connected to the conductive braid shield. The LED is illuminated when the braid shield is intact with a current flowing from the load end side of the GFCI through the diode and a series resistor to the ground wire at the receptacle. If the braid shield were to become discontinuous, then the LED would be extinguished depicting a lack of protection by that conductive braid shield. Because the braid shield is electrically connected to the ground wire, excess ground fault or leakage current is passed to ground while the GFCI detects an imbalance within the phase or neutral wires and trips to open circuit the electrical path through the cord.

U.S. Patent Application Publication No. 2003/0066670 discloses an electrical cable with a grounding device. A bipolar cable includes two conductors (active, live or neutral conductors), an insulating coating on each of the conductors, and an external protection conductor (woven with wire, strands, plait, strap or mesh, which surrounds it concentrically in the form of a sheath) around each of the individual cores. An outer insulating sheath covers the cable.

U.S. Patent Application Publication Nos. 2004/0070895 and 2004/0070899 disclose an LCDI extension cord with cord diagnostics and/or inadvertent ground-to-neutral detection. Three electrical conductors comprise a three-wire conductor having an alternating current (AC) power source compatible plug at the source end, a control circuit and interrupter circuit contained in the plug, and a detector contained within the appliance. A fourth electrical conductor can be a single un-insulated wire which runs substantially parallel with the other wires in the cord, or it can be a spiral wound wire or a conductive shield which surrounds the insulated phase, neutral and ground conductors in the cord. This shield may be a conductive shield which surrounds the various conductors of the extension cord, or may be one or more wires in substantially parallel relationship with the other wires in the cord, or may be one or more wires which surround the various wires in the extension cord. In one embodiment, the LCDI circuit is located in the plug of an extension cord and has a shield integrity indicator in the receptacle of the extension cord. In another similar embodiment, the shield integrity indicator is in the plug and there is a return wire from the shield to that shield integrity indicator in the cord. In another similar embodiment, a shield integrity indicator test switch is in the extension cord plug and there is a return wire from the shield to that test switch in the cord.

There is room for improvement in corded leakage-current detection and interruption apparatus, and in detection mechanisms for cord faults in such apparatus.

SUMMARY OF THE INVENTION

These needs and others are met by the present invention, which provides a leakage-current detection and interruption device including a cord having two additional, non-load carrying, non-ground conductors (e.g. two conductors, such as wires; one wire conductor and one shield conductor) at least one of which is not a shield for the power conductors and that are used to sense one or more cord faults.

In accordance with one aspect of the invention, a leakage-current detection and interruption apparatus for a load comprises: a plug adapted to receive an alternating current voltage; at least one pair of separable contacts adapted to receive the alternating current voltage from the plug; an operating mechanism adapted to open and close the separable contacts; a cord comprising two power conductors adapted to electrically conduct the alternating current voltage from the separable contacts to the load, and two non-load carrying, non-ground conductors at least one of which does not shield one or both of the power conductors; and a detection circuit adapted to detect a plurality of faults in the cord, the detection circuit comprising a ground fault detection circuit comprising a current transformer including an opening through which the power conductors pass, the ground fault detection circuit cooperating with the two non-load carrying, non-ground conductors to detect at least one of the faults and with the operating mechanism to interrupt the detected faults.

The two power conductors may carry a load current, and the non-load carrying, non-ground conductors may carry a current which is substantially less than the load current.

The current transformer may be a first current transformer disposed within or proximate to the plug. The detection circuit may further comprise a second current transformer disposed proximate the first current transformer and a third current transformer disposed proximate the load. The power conductors may comprise a line conductor and a neutral conductor. The second and third current transformers may include an opening through which the neutral conductor passes. The first current transformer may include a first secondary winding, the second current transformer may include a second secondary winding electrically connected in parallel with the first secondary winding, and the third current transformer may include a third secondary winding electrically connected in antiparallel with the first secondary winding.

The third current transformer may be mounted in a receptacle for the load at about the load end of the line and neutral conductors.

The current transformer may further include a first secondary winding, a second secondary winding and a third secondary winding. The detection circuit may further comprise a first resistor and a second resistor. The power conductors may comprise a line conductor including a line end and a load end, and a neutral conductor including a line end and a load end. The first one of the non-load carrying, non-ground conductors may be electrically connected in series with the first resistor between about the load end of the line conductor and about the line end of the line conductor. A second one of the non-load carrying, non-ground conductors may be electrically connected in series with the second resistor between about the load end of the neutral conductor and about the line end of the neutral conductor. A portion of the series combination of the first one of the non-load carrying, non-ground conductors and the first resistor may electrically connect to the second secondary winding. A portion of the series combination of the second one of the non-load carrying, non-ground conductors and the second resistor may electrically connect to the third secondary winding. The second and third secondary windings may have a common winding polarity.

The detection circuit may further comprise a first resistor, a second resistor and a third resistor. The power conductors may comprise a line conductor including a line end and a load end, and a neutral conductor including a line end and a load end. The first resistor may be electrically connected to about the line end of the line conductor, the second resistor may be electrically connected to about the line end of the neutral conductor and the third resistor may be electrically connected to about the load end of the line conductor. A first one of the non-load carrying, non-ground conductors may be electrically connected in series with the first resistor between about the load end of the neutral conductor and about the line end of the line conductor. A second one of the non-load carrying, non-ground conductors may be electrically connected in series between the second and third resistors. The second one of the non-load carrying, non-ground conductors may be a shield disposed about the line conductor. The current transformer may include a first secondary winding, a second secondary winding, and a third secondary winding. A portion of the series combination of the first one of the non-load carrying, non-ground conductors and the first resistor may electrically connect to the second secondary winding. A portion of the series combination of the second one of the non-load carrying, non-ground conductors and the second and third resistors may electrically connect to the third secondary winding.

The third resistor may be adapted to be mounted in a receptacle for the load at about the load end of the line and neutral conductors.

The detection circuit may be mounted within the plug.

As another aspect of the invention, a leakage-current detection and interruption apparatus for a load comprises: a plug adapted to receive an alternating current voltage; at least one pair of separable contacts adapted to receive the alternating current voltage from the plug; an operating mechanism adapted to open and close the separable contacts; a cord comprising two power conductors adapted to electrically conduct the alternating current voltage from the separable contacts to the load, and two non-load carrying, non-ground conductors at least one of which does not shield one or both of the power conductors; a detection circuit adapted to detect a plurality of faults in the cord, the detection circuit comprising a ground fault detection circuit comprising a current transformer including an opening through which the power conductors pass, the ground fault detection circuit cooperating with the two non-load carrying, non-ground conductors to detect at least one of the faults and with the operating mechanism to interrupt the detected faults; and a receptacle adapted to source the alternating current voltage to the load.

The detection circuit may be mounted within the plug, and the power conductors, the ground conductor, and the non-load carrying, non-ground conductors may terminate at the receptacle.

A first portion of the detection circuit may be mounted within the plug and a second portion of the detection circuit may be mounted within the receptacle.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "antiparallel" means the same as the term "parallel" but oppositely directed or oriented, such as, for example, oppositely directed or oriented secondary windings of current transformers.

The present invention is described in association with a leakage-current detection and interruption (LCDI) apparatus for a load, such as an air conditioner, although the invention is applicable to LCDIs for a wide range of different loads.

Figure 1:
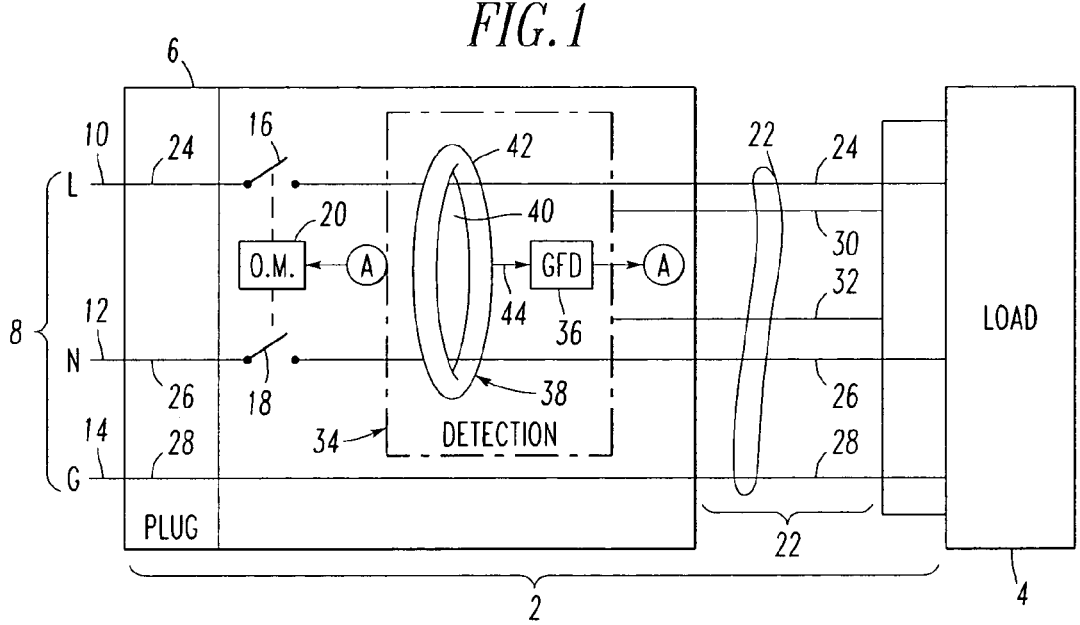
FIG. 1 is a block diagram of a leakage-current detection and interruption (LCDI) device in accordance with the present invention.

Referring to FIG. 1, an LCDI apparatus 2 for a load 4 includes a plug 6 adapted to receive an alternating current (AC) voltage 8 from conventional line (L) 10, neutral (N) 12 and ground (G) 14 conductors of an AC power source (not shown). One or two pairs 16,18 of separable contacts are adapted to receive the AC voltage 8 from the plug 6. Although two separable contact pairs 16,18 are shown, only the pair 16 is required. As is conventional, an operating mechanism (O.M.) 20 is adapted to open and close the separable contacts 16,18. The LCDI 2 also includes a cord 22 including two power conductors, such as a line conductor 24 and a neutral conductor 26, adapted to electrically conduct the AC voltage 8 from the separable contact pairs 16,18 to the load 4, a ground conductor 28, and two non-load carrying, non-ground conductors 30,32. As will be discussed below in connection with FIGS. 2-4, one or both of the conductors 30,32 does (do) not shield one or both of the power conductors 24,26. For convenience of illustration, various insulators for the various conductors 24,26,30,32 and/or the cord 22 and/or the ground conductor 28 are not shown. Alternatively, in a suitable cord, such as, for example, a "double-insulated" cord (not shown), the ground conductor 28 is not required.

The LCDI 2 further includes a detection circuit 34 adapted to detect a plurality of faults in the cord 22. The detection circuit 34 includes a ground fault detection (GFD) circuit 36 including a current transformer 38 having an opening 40 through which the power conductors 24,26 pass. The ground fault detection circuit 36 cooperates with the conductors 30,32 to detect one or more of the faults and with the operating mechanism 20 to interrupt the detected faults.

Example 1

The two power conductors 24,26 carry a load current for the load 4, while the two non-load carrying, non-ground conductors 30,32 carry a current which is substantially less than the load current.

Example 2

The current transformer 38 preferably includes a ferrite core 42 having the opening 40.

Example 3

Figure 2:
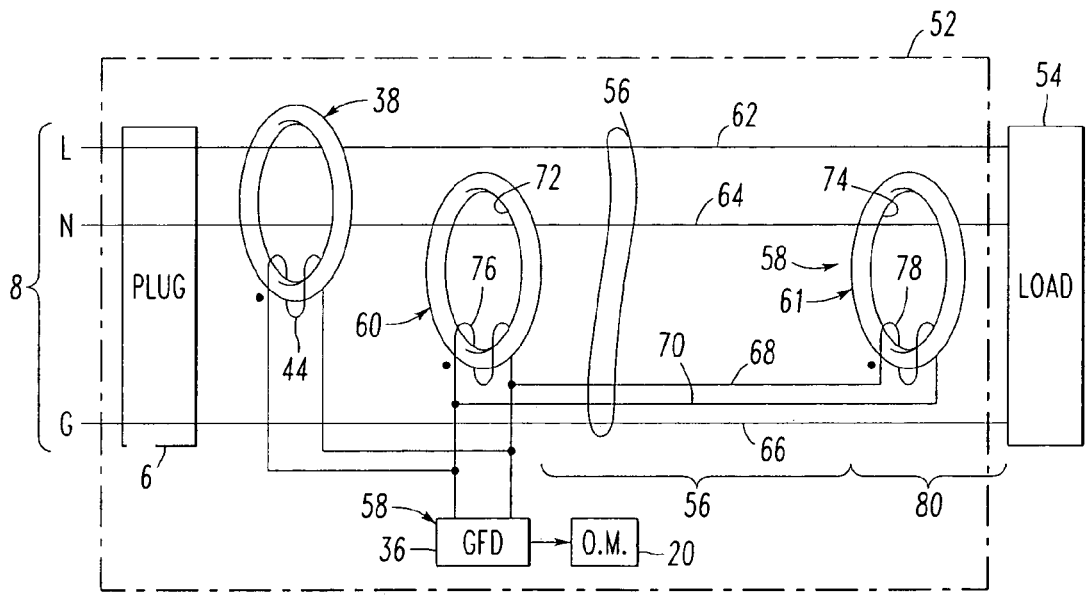
FIG. 2 is a block diagram of a fault detection circuit for the LCDI device of FIG. 1 in accordance with an embodiment of the invention.
Figure 3:
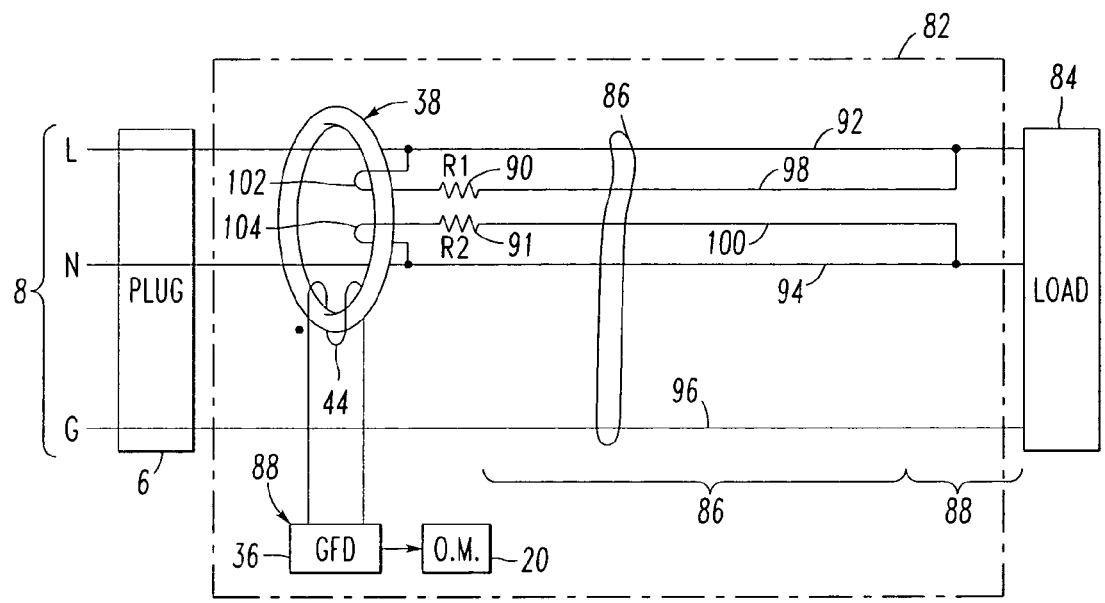
FIGS. 3 and 4 are block diagrams of fault detection circuits for the LCDI device of FIG. 1 in accordance with other embodiments of the invention.
Figure 4:
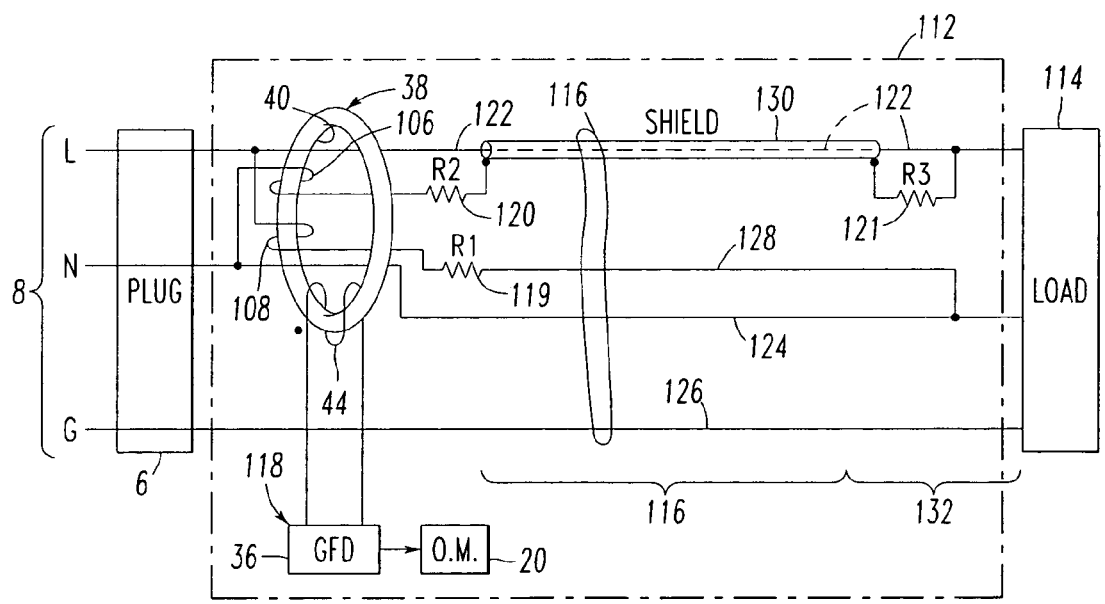

A non-limiting example of the ground fault detector (GFD) 36 is disclosed in U.S. Pat. Nos. 4,081,852 and 3,736,468, which are incorporated by reference herein. The GFD 36 may be employed apart from or in addition to an arc fault detector (not shown). The example GFD 36 is of the differential transformer type. The power conductors 24,26 extend through the ferrite core 42 as primary windings, each preferably of a single turn although multiple turn windings may be used if desired. The illustration of the conductors 24,26 is merely schematic and in accordance with a preferred form. The conductors 24,26 are in coaxial arrangement as they pass through the core 42. A sensing winding or sensor 44, usually of a plurality of turns (as best shown in FIGS. 2-4), is provided on the core 42 for sensing an imbalance in the conduction current levels of the conductors 24,26. Such an imbalance produces a sensed current in the winding 44 which, if of sufficient magnitude and occurring for a sufficient time, actuates a trip circuit (not shown) of the GFD 36 in order to actuate the operating mechanism 20.

Example 4

Referring to FIG. 2, another LCDI apparatus 52 for a load 54 is shown. The LCDI apparatus 52 provides ground fault and line-to-neutral fault detection for the cord 56. In this example, the first current transformer (CT) 38 is disposed within (not shown) or proximate to (as shown) the plug 6. A detection circuit 58 is similar to the detection circuit 34 of FIG. 1, but also includes a second CT 60 disposed proximate the first CT 38 and a third CT 61 disposed proximate the load 54. Similar to the cord 22 of FIG. 1, the cord 56 includes two power conductors, such as a line conductor 62 and a neutral conductor 64, adapted to electrically conduct the AC voltage 8 from one or two separable contact pairs (not shown) to the load 54, a ground conductor 66, and two non-load carrying, non-ground conductors 68,70. The second and third CTs 60,61 include respective openings 72,74 through which the neutral conductor 64 passes. The first CT 38 includes a first secondary winding 44, the second CT 60 includes a second secondary winding 76 electrically connected in parallel with the first secondary winding 44, and the third CT 61 includes a third secondary winding 78 electrically connected in antiparallel with the first secondary winding 44, as shown. The ground fault detection circuit 36 receives the first secondary winding 44 to provide ground fault detection of ground faults, and receives the second and third secondary windings 76,78 to provide line-to-neutral fault detection of line-to-neutral faults.

Example 5

The third CT 61 may be mounted in a receptacle 80 for the load 54 at about the load end of the line and neutral conductors 62,64.

Example 6

The first CT 38 senses ground fault current at about 20 mA to about 100 mA. The second and third CTs 60,61 monitor the current entering and leaving the neutral conductor 64. If these two currents are not equal, then the difference is the neutral fault current. If the neutral fault current is to ground, then the second and third CTs 60,61 are phased, as shown, in order that the sensed current is additive to the first CT 38 which senses the ground fault current. This detection circuit 58 advantageously provides AFCI protection since it protects against low level (e.g., about 20 mA to about 100 mA) line-to-line or line-to-ground faults. The two extra low current, non-load carrying, non-ground conductors 68,70 electrically connect the load side CT 61 to the line side CT 60 of the detection circuit 58. The secondary winding outputs 76,78 of the respective second and third CTs 60,61 are phased in order that the load passing through both is subtractive at the output such that the sum of those output currents is normally essentially about zero.

Example 7

If the secondary windings 76,78 have N output turns of, for example, N=1000 turns, then the output currents and the normal sum of those currents are shown in Equations 1-3:

$$CT\_output2 = I\_load/N \quad \text{(Eq. 1)}$$

$$CT\_output3 = -I\_load/N \quad \text{(Eq. 2)}$$

$$0 = CT\_output2 + CT\_output3 \quad \text{(Eq. 3)}$$

wherein:

CT_output2 is the output current of the second secondary winding 76;

CT_output3 is the output current of the third secondary winding 78; and

I_load is the load current of the load 54 flowing in the neutral conductor 64 (and normally also flowing in the line conductor 62).

Example 8

FIG. 3 shows another LCDI apparatus 82 for a load 84. The LCDI apparatus 82 provides ground fault and open conductor detection for the cord 86. In this example, the current transformer (CT) 38 is disposed within (not shown) or proximate to (as shown) the plug 6. A detection circuit 88 is similar to the detection circuit 34 of FIG. 1, but also includes a first resistor (R1) 90 and a second resistor (R2) 91. Similar to the cord 22 of FIG. 1, the cord 86 includes two power conductors, such as a line conductor 92 and a neutral conductor 94, adapted to electrically conduct the AC voltage 8 from one or two separable contact pairs (not shown) to the load 84, a ground conductor 96, and two non-load carrying, non-ground conductors 98,100.

The first non-load carrying, non-ground conductor 98 is electrically connected in series with the first resistor 90 between about the load end of the line conductor 92 and about the line end of the line conductor 92. The second non-load carrying, non-ground conductor 100 is electrically connected in series with the second resistor 91 between about the load end of the neutral conductor 94 and about the line end of the neutral conductor 94. A portion of the series combination of the first conductor 98 and the first resistor 90 electrically connects to (e.g., forms; forms with another conductor; electrically connects to another conductor) a second secondary winding 102 of the CT 38. A portion of the series combination of the second conductor 100 and the second resistor 91 electrically connects to a third secondary winding 104 of the CT 38. The second and third secondary windings 102,104 have a common winding polarity and may have one or more turns.

The detection circuit 88 uses the single ground fault CT 38 and the two extra low current, non-load carrying, non-ground conductors 98,100 in the cord 86 to detect breakage of the line or neutral conductors 92,94 in the cord 86 as well as to provide conventional ground fault protection. Normally, relatively small currents of equal magnitude flow in the conductors 98,100. A broken cord power conductor causes the load side voltage between power conductors 92 and 94 of the cord 86 to be zero. This causes a fault level current to flow in one of the sense conductors 98,100 and through one of the first and second resistors 90,91, which is detected by the GFD circuit 36. This GFD circuit 36 receives the first secondary winding 44 to provide ground fault detection, and receives the second and third secondary windings 102,104 to provide open conductor detection of an open conductor fault for the line or neutral conductors 92,94.

For example, if the power conductor 92 is broken someplace between the first resistor 90 connection to power conductor 92 and the connection of conductor 98 to power conductor 92, then the load side of broken power conductor 92 is substantially at the neutral voltage because the load 84 electrically connects to these two power conductors 92,94 and the break in power conductor 92 prevents load current from flowing to the load 84 through power conductor 92. Therefore, the line side voltage from power conductor 92 to power conductor 94 is across resistor 90 which senses the voltage across the broken power conductor 92. The current through resistor 90 is sensed by CT 38 to activate the detection circuit 88.

For example, if the power conductor 94 is broken someplace between the second resistor 91 connection to power conductor 94 and the connection of conductor 100 to power conductor 94, then the load side of broken power conductor 94 is substantially at the line voltage because the load 84 electrically connects to these two power conductors 92,94 and the break in power conductor 94 prevents load current from flowing to the load 84 through power conductor 94. Therefore, the line side voltage from power conductor 92 to power conductor 94 is across resistor 91 which senses the voltage across the broken power conductor 94. The current through resistor 91 is sensed by CT 38 to activate the detection circuit 88.

Example 9

The resistors 90,91 preferably have about the same resistance.

Example 10

As shown in the examples of FIGS. 2 and 3, the non-load carrying, non-ground conductors 68,70 and 98,100, respectively, are wire conductors.

Example 11

Referring to FIG. 4, another LCDI apparatus 112 for a load 114 is shown. The LCDI apparatus 112 provides ground fault, open conductor and line-to-neutral fault detection for the cord 116. In this example, the current transformer (CT) 38 is disposed within (not shown) or proximate to (as shown) the plug 6. A detection circuit 118 is similar to the detection circuit 34 of FIG. 1, but also includes a first resistor (R1) 119, a second resistor (R2) 120 and a third resistor (R3) 121. Similar to the cord 22 of FIG. 1, the cord 116 includes two power conductors, such as a line conductor 122 and a neutral conductor 124, adapted to electrically conduct the AC voltage 8 from one or two separable contact pairs (not shown) to the load 114, a ground conductor 126, and two non-load carrying, non-ground conductors, which include a wire conductor 128 and a shield 130. The first resistor 119 is electrically connected to about the line end of the line conductor 122, the second resistor 120 is electrically connected to about the line end of the neutral conductor 124 and the third resistor 121 is electrically connected to about the load end of the line conductor 122. The wire conductor 128 is electrically connected in series with the first resistor 119 between about the load end of the neutral conductor 124 and about the line end of the line conductor 122. The shield 130, which is disposed about the line conductor 122, is electrically connected in series between the second and third resistors 120,121. A portion of the series combination of the wire conductor 128 and the first resistor 119 electrically connect to (e.g., forms; forms with another conductor; electrically connects to another conductor) a second secondary winding 108 (e.g., having one or more turns, as shown) of the CT 38. A portion of the series combination of the shield 130 and the second and third resistors 120,121 electrically connects to a third secondary winding 106 (e.g., having one or more turns, as shown) of the CT 38.

The ground fault detection circuit 36 receives the first CT secondary winding 44 to provide ground fault detection. The second and third secondary windings 108,106 provide open conductor detection and line-to-neutral fault detection.

The open conductor protection is provided in a somewhat similar manner as was discussed above in connection with FIG. 3. Normally, relatively small currents of essentially equal magnitude flow in the conductors 128,130. A broken cord power conductor, such as 122 or 124, causes the current in the corresponding low current, non-load carrying, non-ground conductor 130 or 128 to become zero. Also, the low current, non-load carrying shield conductor 130 in the cord 116 is disposed about the line conductor 122 to provide fault protection between the line and neutral conductors 122,124. If, for example, the neutral conductor 124 is electrically connected to the shield 130, which is a fault that would occur prior to or instead of the neutral conductor 124 being electrically connected to the line conductor 122, then the current in the non-load carrying, non-ground conductor 128 would be significantly different than the current in the non-load carrying shield conductor 130, thereby causing a trip condition.

Example 12

The second and third resistors 120,121 have about the same resistance. The first resistor 119 has a resistance which is about twice the resistance of the second and third resistors 120,121.

Example 13

The third resistor 121 may be adapted to be mounted in a receptacle 132 for the load 114 at about the load end of the line and neutral conductors 122,124.

Example 14

Figure 5:
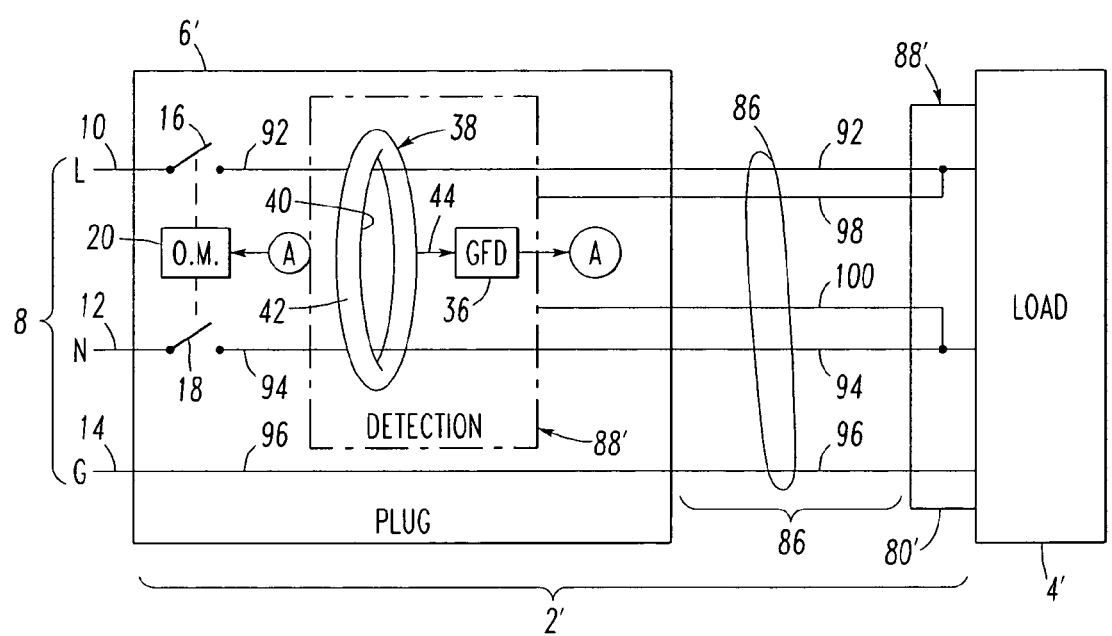
FIG. 5 is a block diagram of an LCDI in accordance with another embodiment of the invention.

FIG. 5 shows another LCDI apparatus 2' for a load 4'. The LCDI apparatus 2' is similar to LCDI apparatus 2 of FIG. 1 and the LCDI apparatus 82 of FIG. 3, except that a receptacle 80' is provided at about the load end of the conductors 92,94,96,98,100 of the cord 86. Within that receptacle 80', the load ends of the conductors 92,98 are electrically connected and the load ends of the conductors 94,100 are electrically connected. In this example, a first portion of the detection circuit 88' is mounted within the plug 6', and a second portion of the detection circuit 88' is mounted within the receptacle 80'.

Example 15

As an alternative to Example 14, similar to, for example, FIG. 3, the first portion of the detection circuit 88' may be mounted proximate to the plug 6'.

Example 16

As another alternative to Example 14, similar to, for example, FIGS. 3 and 4, the power conductors 92,94, the ground conductor 96, and the non-load carrying, non-ground conductors 98,100 may terminate at the load 4'.

Example 17

The GFD circuit 36 may be implemented as a combination of one or more of analog, digital and/or processor-based circuits.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A leakage-current detection and interruption apparatus for a load, said apparatus comprising:
   a plug adapted to receive an alternating current voltage;
   at least one pair of separable contacts adapted to receive said alternating current voltage from said plug;
   an operating mechanism adapted to open and close said separable contacts;
   a cord comprising two power conductors adapted to electrically conduct said alternating current voltage from said separable contacts to said load, and two non-load carrying, non-ground conductors at least one of which does not shield one or both of said power conductors; and
   a detection circuit adapted to detect a plurality of faults in said cord, said detection circuit comprising a ground fault detection circuit comprising a current transformer including an opening through which said power conductors pass, said ground fault detection circuit cooperating with said two non-load carrying, non-ground conductors to detect at least one of said faults and with said operating mechanism to interrupt said detected faults; wherein said current transformer is a first current transformer disposed within or proximate to said plug; wherein said detection circuit further comprises a second current transformer disposed proximate said first current transformer and a third current transformer disposed proximate said load; wherein said power conductors comprise a line conductor and a neutral conductor; wherein said second and third current transformers include an opening through which said neutral conductor passes; and wherein said first current transformer includes a first secondary winding, said second current transformer includes a second secondary winding electrically connected in parallel with said first secondary winding, and said third current transformer includes a third secondary winding electrically connected in antiparallel with said first secondary winding.

2. The leakage-current detection and interruption apparatus of claim 1 wherein said faults include a ground fault and a line-to-neutral fault; and wherein said ground fault detection circuit receives said first secondary winding to provide ground fault detection of said ground fault, and receives said second and third secondary windings to provide line-to-neutral fault detection of said line-to-neutral fault.

3. The leakage-current detection and interruption apparatus of claim 1 wherein said third current transformer is mounted in a receptacle for said load at about the load end of said line and neutral conductors.

4. A leakage-current detection and interruption apparatus for a load, said apparatus comprising:
  a plug adapted to receive an alternating current voltage;
  at least one pair of separable contacts adapted to receive said alternating current voltage from said plug;
  an operating mechanism adapted to open and close said separable contacts;
  a cord comprising two power conductors adapted to electrically conduct said alternating current voltage from said separable contacts to said load, and two non-load carrying, non-ground conductors at least one of which does not shield one or both of said power conductors; and
  a detection circuit adapted to detect a plurality of faults in said cord, said detection circuit comprising a ground fault detection circuit comprising a current transformer including an opening through which said power conductors pass, said ground fault detection circuit cooperating with said two non-load carrying, non-ground conductors to detect at least one of said faults and with said operating mechanism to interrupt said detected faults; wherein said detection circuit further comprises a first resistor, a second resistor and a third resistor; wherein said power conductors comprise a line conductor including a line end and a load end, and a neutral conductor including a line end and a load end; wherein said first resistor is electrically connected to about the line end of said line conductor, said second resistor is electrically connected to about the line end of said neutral conductor and said third resistor is electrically connected to about the load end of said line conductor; wherein a first one of said non-load carrying, non-ground conductors is electrically connected in series with said first resistor between about the load end of said neutral conductor and about the line end of said line conductor; wherein a second one of said non-load carrying, non-ground conductors is electrically connected in series between said second and third resistors, said second one of said non-load carrying, non-ground conductors being a shield disposed about said line conductor; wherein said current transformer includes a first secondary winding, a second secondary winding and a third secondary winding; wherein a portion of the series combination of said first one of said non-load carrying, non-ground conductors and said first resistor electrically connects to said second secondary winding; and wherein a portion of the series combination of said second one of said non-load carrying, non-ground conductors and said second and third resistors electrically connects to said third secondary winding.

5. The leakage-current detection and interruption apparatus of claim 4 wherein said faults include a ground fault, an open conductor fault and a line-to-neutral fault; wherein said ground fault detection circuit receives said first secondary winding to provide ground fault; and wherein said second and third secondary windings provide open conductor detection of said open conductor fault and line-to-neutral fault detection of said line-to-neutral fault.

6. The leakage-current detection and interruption apparatus of claim 5 wherein said second resistor has a resistance; wherein said third resistor has about the same said resistance; and wherein said first resistor has a resistance which is about twice the resistance of said second and third resistors.

7. The leakage-current detection and interruption apparatus of claim 5 wherein said third resistor is adapted to be mounted in a receptacle for said load at about the load end of said line and neutral conductors.

8. A leakage-current detection and interruption apparatus for a load, said apparatus comprising:
  a plug adapted to receive an alternating current voltage;
  at least one pair of separable contacts adapted to receive said alternating current voltage from said plug;
  an operating mechanism adapted to open and close said separable contacts;
  a cord comprising two power conductors adapted to electrically conduct said alternating current voltage from said separable contacts to said load, and two non-load carrying, non-ground conductors at least one of which does not shield one or both of said power conductors;
  a detection circuit adapted to detect a ground fault and an open conductor fault in said cord, said detection circuit comprising a ground fault detection circuit comprising a current transformer including an opening through which said power conductors pass, said ground fault detection circuit cooperating with said two non-load carrying, non-ground conductors to detect said ground fault and detect said open conductor fault and with said operating mechanism to interrupt said detected ground fault and said detected open conductor fault; and
  wherein said current transformer further includes a first secondary winding, a second secondary winding and a third secondary winding; wherein said detection circuit further comprises a first resistor and a second resistor; wherein said power conductors comprise a line conductor including a line end and a load end, and a neutral conductor including a line end and a load end; wherein a first one of said non-load carrying, non-ground conductors is electrically connected in series with said first resistor between about the load end of said line conductor and about the line end of said line conductor; wherein a second one of said non-load carrying, non-ground conductors is electrically connected in series with said second resistor between about the load end of said neutral conductor and about the line end of said neutral conductor; wherein a portion of the series combination of said first one of said non-load carrying, non-ground conductors and said first resistor electrically connects to said second secondary winding; and wherein a portion of the series combination of said second one of said non-load carrying, non-ground conductors and said second resistor electrically connects to said third secondary winding, said second and third secondary windings having a common winding polarity.

9. The leakage-current detection and interruption apparatus of claim 8 wherein said first resistor has a resistance; and wherein said second resistor has about the same said resistance.

10. The leakage-current detection and interruption apparatus of claim 8 wherein said ground fault detection circuit receives said first secondary winding to provide ground fault detection of said ground fault; and wherein said second and third secondary windings provide open conductor detection of said open conductor fault for said line or neutral conductors.

* * * * *